Sept. 5, 1939.     O. H. BANKER     2,171,534
AUTOMATIC TRANSMISSION
Filed May 29, 1935     3 Sheets-Sheet 1

INVENTOR.
Oscar H. Banker
BY Charles & French
ATTORNEYS

Sept. 5, 1939.   O. H. BANKER   2,171,534
AUTOMATIC TRANSMISSION
Filed May 29, 1935   3 Sheets-Sheet 2

INVENTOR.
Oscar H. Banker
BY Charles J. French
ATTORNEYS

Sept. 5, 1939.  O. H. BANKER  2,171,534
AUTOMATIC TRANSMISSION
Filed May 29, 1935  3 Sheets-Sheet 3
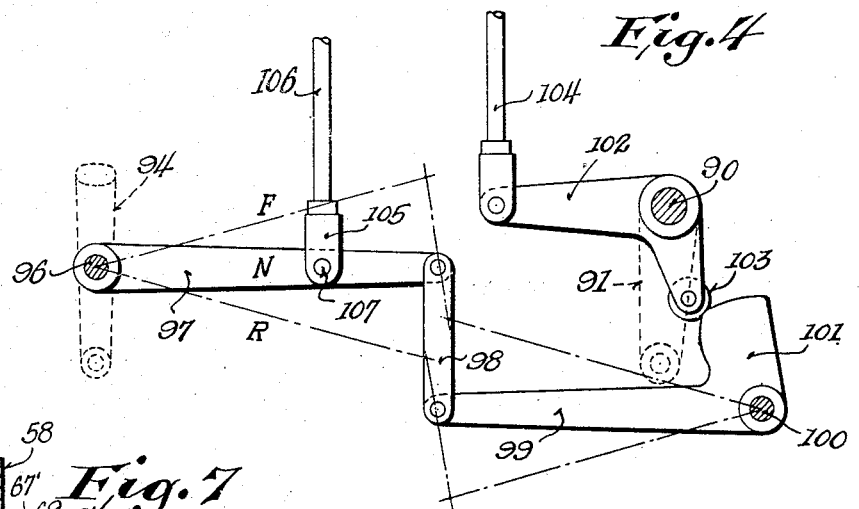
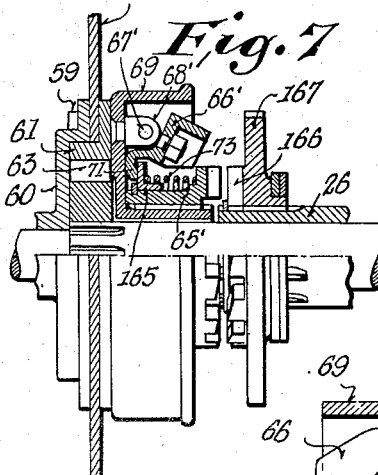
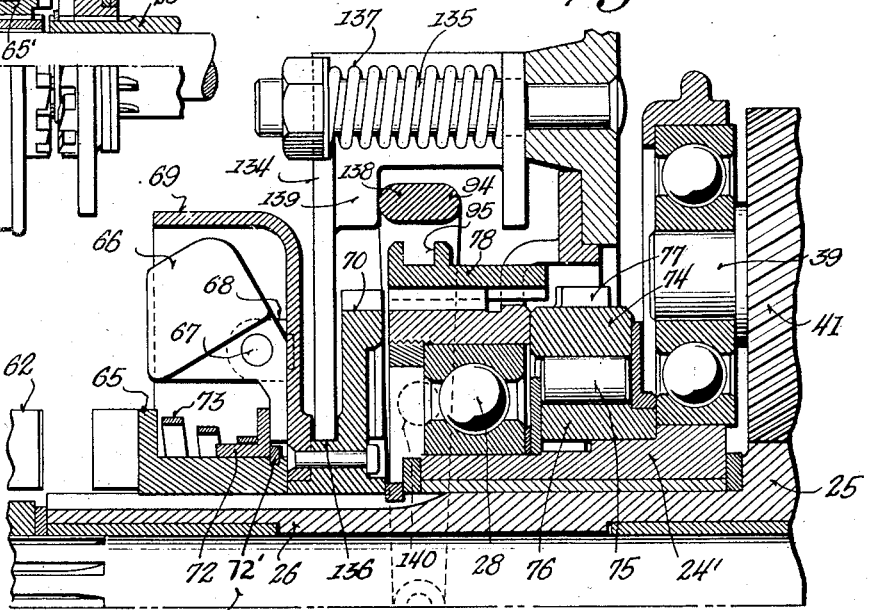
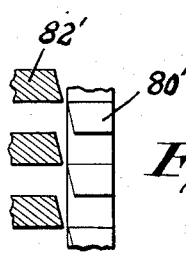
INVENTOR.
Oscar H. Banker
BY Charles French
ATTORNEYS Patented Sept. 5, 1939

2,171,534

UNITED STATES PATENT OFFICE 2,171,534

AUTOMATIC TRANSMISSION

Oscar H. Banker, Chicago, Ill., assignor to New Products Corporation, Chicago, Ill., a corporation of Delaware Application May 29, 1935, Serial No. 24,035

22 Claims. (Cl. 74—260)

The invention relates to automatic transmissions and more particularly to planetary type transmissions.

One object of the invention is to provide a transmission which simplifies and improves such structures heretofore proposed by me and especially that of my co-pending application Serial No. 640,989, filed November 3, 1932.

According to the present invention the second speed clutch is formed as an overrunning jaw type clutch with the clearance of the jaws or backlash greater than the backlash of the gears, so that there is a certain freedom of movement between the two transmission drive shafts which enables the manual or automatic operation of the high speed clutch to be smoothly effected. It is to be noted that due to the differential action of the planetary gears and the fact that one of the transmission drive shafts is coupled with an overrunning roller clutch that is apt to pick up any little movement of the shafts, this freedom of movement between the shafts is important. The low gear drive shaft of the transmission has one end mounted on a solid bearing provided on the carrier which is mounted solidly on bearings at its opposite ends making a rigid suspension contributing to the quietness of the transmission. The direct drive connection is made with the driven shaft through a single straight jaw automatic clutch which is also releasable by a manual control.

A further object of the invention is to provide a brake mechanism, preferably associated with the low speed clutch, which permits the speeding up of the shift of transmission. Thus it may be used to slow down the engine quicker than it can be decelerated so as to speed up the shift under normal running conditions or it may be used when the vehicle is in neutral and previous to engagement for forward or reverse. Under the last named conditions the operator may be racing the motor, as during the warming up period, and when he tries to decelerate the motor again so as to facilitate putting the transmission in either forward or reverse the heavy masses of the low speed clutch will not slow down fast enough and consequently in that instance he can apply the brake to said clutch and thus bring about a condition which will enable him to shift quickly. According to the present invention the control of this brake mechanism is without any additional foot lever through the association of the control with the accelerator pedal and the brake mechanism is power operated as by means of vacuum pressure from the intake manifold.

A further object of the invention is to provide an arrangement whereby the automatic operation of the second speed clutch is speeded up as compared to my former constructions and more particularly the mounting of the weights for the speed responsive means upon the main engine clutch, so that they can be energized much sooner and a quicker shift from low to second accomplished.

A further object of the invention is to provide a transmission of the type above described in which the second speed jaw clutch may be moved manually so that when the engine is being raced in neutral the jaws will be separated and also so that an engagement, independent of the centrifugal clutch mechanism, may be effected thus facilitating starting the car in second gear and also its disconnection from its power drive to bring the transmission back to neutral gear, thus allowing the car to roll without pulling the engine with it.

A further object is to provide a simple and efficient lubricating arrangement by which the rotating parts are kept constantly supplied with lubricant.

The invention further consists in the several features hereinafter set forth and more particularly defined by claims at the conclusion hereof.

In the drawings:

Fig. 4 is a detail view of control mechanism for the transmission mechanism;

Fig. 5 is a detail vertical sectional view showing certain modifications in the forward part of the transmission;

Fig. 6 is a detailed view partly in section of certain modifications in the high speed clutch mechanism;

Fig. 7 is a detailed vertical sectional view showing a certain modification in the forward part of the transmission;

Figure 1:
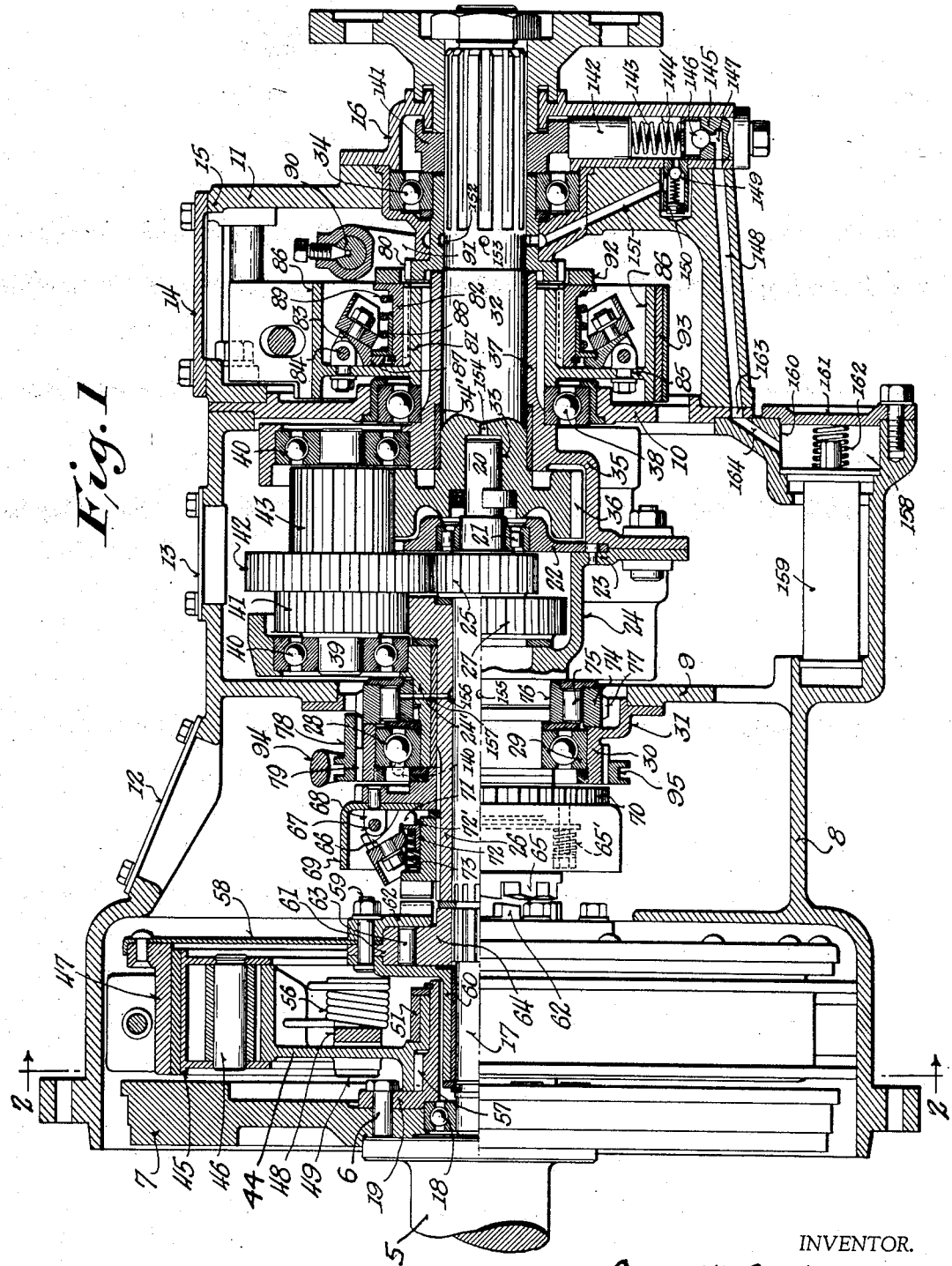
Fig. 1 is a vertical sectional view of a transmission embodying the invention, some of the interior parts in their lower half portions being shown in full.

Referring to the drawings, and more particularly to Fig. 1, the numeral 5 designates the engine drive shaft or crank shaft connected by bolts 6 to the engine fly wheel 7 enclosed in the front end of a case 8 which has a bearing-carrier wall 9, intermediate its ends, and has at one end an end plate 10 detachably secured to it and also an end section 11 detachably secured to it and said end plate. Removable top covers 12 and 13 are provided for openings giving access to parts of the casing 8 and a cover 14 for an opening 15 in the end section 11 which also has a pump casing section 16 connected to it.

The transmission drive shaft 17 has one end journalled in a ball bearing journal 18 whose outer race is mounted in an axial recess in the fly wheel 7 and clamped in position by a flanged hub member 19 which is connected to the fly wheel through the bolts 6, the other end 20 of said shaft having a part which is journalled in a roller bearing journal 21 mounted in a plate or wall portion 22 which is solidly connected, as by rivets 23, with one of the parts of the planetary transmission carrier 24. A gear 25 is formed integral with or connected to the shaft 17 adjacent the bearing 21.

A tubular transmission drive shaft 26 having a gear 27 formed integral therewith or connected to one end thereof is mounted to turn on and relative to part of the drive shaft 17 and is in turn journalled in a bushed hub 24' forming one of the hub ends of the planetary carrier 24 which hub in turn is journalled in a ball bearing journal 28 whose outer race ring 29 is mounted on a supporting ring 30 having arms 31 (one of which is shown), said arms being radially disposed and detachably bolted to the bearing wall 9. A driven shaft 32 has one end provided with a bore 33 to loosely receive the extended part of the end 20 and is journalled on the bushed bearing 34' of the hub of the section 35 of the planetary carrier and its other end portion is journalled on a ball bearing 34. The shaft 32 has a driven gear 36 formed integral therewith or connected thereto. The section 35 of the carrier has its hub 37 in turn journalled on a ball bearing journal 38 carried by the removable end plate 10. Thus the planetary carrier is solidly mounted to revolve in the bearings 28 and 38 and the inner end of the drive shaft 17 is solidly mounted to revolve in the journal bearing 21 that is carried by said carrier.

The parts of the planetry casing or carrier 24 have planet gear shafts, one of which 39 is shown mounted in ball bearings 40 carried by the sections of said carrier and upon which the compound planet gears 41, 42, and 43 are mounted, these gears being either separate or formed integral with the shaft 39 as desired or found necessary by the type of gear used. Gears 41, 42, and 43 mesh respectively with the gears 27, 25, and 36.

It will be understood that two similar sets of compound gears are disposed equidistant from each other and from the set shown to provide three sets of compound gears with a 120° axial spacing.

With the above arrangement, low speed is obtained when the gear 25 is the driver and the planet gear carrier is held against rotation, the drive then being from the shaft 17 through gears 25, 42, 43, 36 to the driven shaft 32; second speed when the shaft 26 with its gear 27 is the driver and the planet gear carrier is held against rotation, the drive then being from the shaft 26 through gears 27, 41, 43, 36; high speed when the planetary carrier and its gears revolve with the shafts 17 and 32; and reverse is obtained when the planetary gear carrier is allowed to rotate freely and the shaft 26 is held against rotation while the gear 25 meshing with the gear 41 drives the planetary gear carrier around gear 27 in an anti-clockwise direction, and thus through the gear 43 drives the gear 36 and the shaft 32 in the reverse direction to that of the shaft 17 and at a speed of about low gear ratio.

For obtaining the drive from the engine shaft 5 any suitable speed responsive clutch mechanism, such as that shown in my prior U. S. Patent No. 1,843,195, dated February 2, 1932, may be used though I prefer the clutch mechanism shown and more particularly described in the aforementioned application Serial No. 640,989 and my copending application Serial No. 599,896, filed March 19, 1932. Briefly, this clutch mechanism embodies a support 44, clutch shoes 45 carried thereby, through slidably mounted anchor pins 46, intermediate their ends and, under the action of speed responsive mechanism, movable into clutching engagement with the drum 47. The speed responsive mechanism includes the weighted levers 48, each of said levers being pivotally mounted intermediate its ends at 49 on a pin carried by said support and connected by a link 50 to an equalizer 51 and also to a link 52 connecting the equalizer with a pair of toggle links or levers 53 at 54, said links 53 being pivotally connected at their other ends 53' to said shoes. Springs 55 normally hold the shoes 45 in release position, and a coiled spring 56 associated with each of the weighted levers 48 serves to hold its lever in contracted position. When the speed of rotation of the support 44 reaches a certain predetermined value the weighted end of the levers 48 swing outwardly against the action of the springs 56 and this movement is transmitted by the links 50, 52 and links 53 to the ends of the shoes 45 to bodily move them into engagement with the drum 47 and against the action of the springs 55. The support 44 is keyed at 57 to the hub of the member 19, and its hub has the equalizer 51 mounted thereon.

The drum 47 has a web portion 58 connected by bolts 59 to a hub member 60, the clutch drum 61 of a one way roller clutch, and one of the clutch elements 62 of an overrunning jaw type clutch. The one way roller clutch also includes the rollers 63 and the actuator member 64 splined to the shaft 17. This clutch has not been shown in detail but is similar to the roller clutch shown in detail in Fig. 3 of Patent No. 1,843,195, and acts in low gear to connect the shaft 17 to the automatic clutch previously described connecting the transmission to the engine shaft 5 and also permits the shaft 17 to free wheel when the shaft 26 becomes a driver.

While in low gear, the gear 41 being a part of the compound planet gears and in mesh with gear 27 causes said gear 27 to turn in a clockwise direction at a higher speed than the gear 36 associated therewith and at a predetermined speed, for example, ten to twelve miles per hour car speed, causes the operation of the speed responsive mechanism that connects the shaft 26 with the shaft 5 to obtain second speed through the gearing previously set forth, and permits of the automatic driving release of the shaft 17 through the overrunning action of the clutch rollers 63.

The shaft 26 is adapted to be coupled to the drum 47 through an overrunning type of jaw clutch in which one of the jaw clutch elements is the part 62 previously mentioned and an intermeshing jaw member 65 slidably keyed on the shaft 26 and in Fig. 1 operable through speed responsive mechanism including weighted levers 66, one of which is shown pivotally mounted on the pin 67 carried by a bracket 68 whose shank connects together a weight movement-limiting and supporting drum 69 and a clutch gear 70 also splined to the shaft 26. The ends 71 of the lever 66 engage a flanged collar 72 and a coil spring 73 forms a yieldable driving connection between this collar 72 and the clutch member 65 itself, said member being normally urged to a withdrawn position by means of springs 65' interposed between the collar 72 and bolts secured to drum 69, said collar then engaging a stop 72' on the member 65.

Thus with the above described construction when the speed of the shaft 26 reaches the desired value the weighted levers 66 through the action of centrifugal force are thrown out and exert through the collar 72 and spring 73 a pressure on the clutch element 65 causing it to move toward the mating clutch element 62 and permitting it to overrun said element until on a temporary reduction in speed of the drive shaft 5 the parts 62 and 65 are permitted to synchronize and then the inclined teeth of clutch jaw 65 snaps into intermeshing engagement with the mating inclined toothed jaw 62 and second speed drive through the gearing previously described is established.

Figure 3:
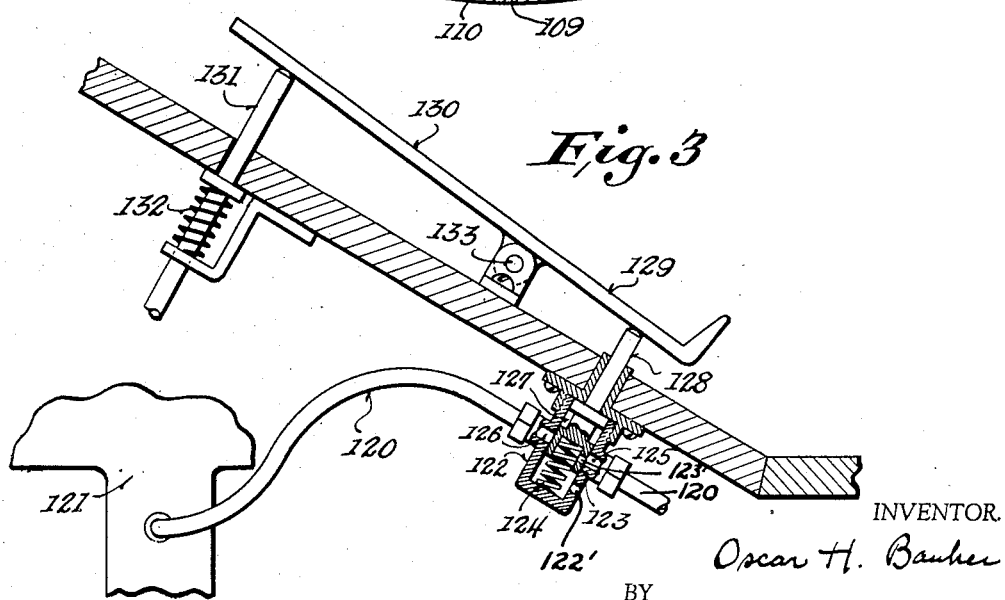
Fig. 3 is a detail view partly in section of one of the controls.

In the condition of the low and second speed ratios as the change speed gearing is of the planetary type, there is a tendency for the planetary gear carrier 24 to be revolved in the reverse direction to the driven gear and means are provided to utilize this tendency to automatically lock the planetary gear carrier against reverse movement which is shown here as a one way brake, similar to the one way roller clutch including the clutch rollers 63 previously described, except that the brake drum 74 is adapted to be held stationary and be engaged by the rollers 75 under the usual wedging action of the actuator 76 (keyed to the hub 24' of the planetary carrier) on the tendency of the planetary gear carrier to rotate backwards or anticlockwise as viewed from the right in Fig. 1 and thus stop this backward rotation. A roller brake of this general form is shown in Fig. 3 of my prior U. S. Patent No. 1,937,503, dated December 5, 1933. However, in the present instance since the planetary carrier is adapted to turn under conditions of reverse drive, means are provided for releasing this automatic brake for reverse, and for this purpose the brake drum 74 has clutch teeth 77 formed thereon adapted to be engaged for forward drive by a shiftable jaw clutch member 78 slidably splined at 79 upon the hub portion 30 of the fixed frame member 31 and released for reverse and shifted so that it meshes with the clutch gear 70 and holds shaft 26 and gear 27 stationary.

It is to be noted that the automatic brake mechanism may be released when the driven shaft, relatively speaking, reaches or exceeds the speed of the driver and this movement to brake disengagement position may be effected by the operator's deceleration of the engine temporarily so as to decrease the speed of the driver gear relative to that of the driven shaft 32, as by throttling. Consequently, when the vehicle is in second speed and the driver wishes to go into high speed or direct drive, he decelerates the engine speed so that the driven shaft 32 becomes the driver tending to turn the engine through the planetary gears and in so doing releases the planetary carrier from the automatic brake mechanism and turns said carrier in the same direction as itself. Under these conditions the planetary carrier may be coupled directly to the driven shaft, and this is done in the present instance through an automatic speed responsive operated high speed clutch.

This high speed clutch includes a straight jaw clutch member 80 splined to the driven shaft 32 and adapted to be coupled to the hub 37 of the planetary carrier through a member 81 splined thereto and having a drum portion 86 and to which a speed responsive operated straight jaw clutch element 82 is slidably splined. The speed responsive means for shifting the element 82 includes the weighted levers 83 pivotally mounted intermediate their ends on pins 84 carried in brackets 85 fastened to the web of the drum 86, the arms 87 of the levers engaging a collar 88 slidably mounted on the clutch member 82 and transmitting the thrust of said levers to said element through the coiled spring 89. The speed responsive mechanism, since it is mounted on the hub of the planetary carrier, is stationary when the transmission is in low or second speed, but when, as previously noted, the operator while in second speed releases the automatic brake for the planetary carrier, then the planetary carrier is free to revolve and in doing so it revolves the drum 86, and the weighted levers 83 move outwardly under the action of centrifugal force and act on the collar 88 and the spring 89 to move the clutch member 82 toward the right so that its teeth may mesh with the teeth of the clutch member 80 to couple the planetary carrier directly with the driven shaft, and under these conditions the planetary gearing is locked as a unit and revolves with the drive shaft 26 and the driven shaft 32 which shafts are then connected through the automatic clutch including the drum 47 direct to the engine shaft 5 for high speed or direct drive.

It is sometimes desirable during driving to change from "high" speed or direct drive to second or a lower speed and for this purpose I have provided a manually controlled shaft 90 having a shifter fork 91 operatively connected to a pressure plate 92 and adapted to engage the shiftable clutch element 82 and move it toward the left to a release position which is also its position in the neutral and reverse condition of the gear as shown in Fig. 1.

There are some occasions when a vehicle has to negotiate difficult or uneven ground when it is necessary to utilize all the available torque of the engine in low gear as, for example, to get one or more of the wheels out of a hole or depression and on such an occasion the members 94 and 91 are shifted to put the transmission in neutral and thus prevent operation of the second speed clutch and free the planetary gear carrier and then race the engine to build up torque and while it is in this condition gradually apply a brake to the planetary carrier and thereby deliver the full torque of the engine through the gearing at the low speed gear ratio. In Fig. 1 I show for this purpose a band brake 93 of the external contracting type adapted to be moved into braking engagement with the drum 86 through any suitable mechanism, one such mechanism being shown more in detail in the aforementioned application Serial No. 640,989.

It has been previously noted that the clutch member 78 is shiftable and for this purpose, in Fig. 1, I show a part of a shifter member 94 which has the usual pins adapted to engage in the annular groove 95 of the member 78 and to shift the same longitudinally while the member 75

94 is swung about an intermediate pivotal mounting. In Fig. 4 the controls are shown somewhat diagrammatically and the numeral 96 designates the shaft with which the shift lever 94 is connected, the shaft 96 having a lever 97 secured thereto at one end and connected by a link 98 with a lever 99 mounted to turn about a pivot 100 and having a cam 101 movable with it. The shaft 90 has a bell crank lever 102 connected thereto with one of the arms carrying a roller 103 adapted to engage the cam 101 while the other arm has a connection with a Bowden wire 104. A connector 105 for another manually controlled wire 106 is pivotally connected at 107 to the intermediate portion of the lever 97. As shown in the drawings, in Fig. 1, the member 78 and the shaft 90 are in a neutral position, and the controls for the shafts 96 and 90 are shown in full in neutral position in Fig. 4. If now the operator pulls on the wire 106 so as to swing the lever 97 upwardly to the dotted line position, the connection of the shaft 96 with the shifter fork 94 will cause this fork to move the shiftable clutch member 78 toward the right as viewed in Fig. 1 so as to connect the frame 30 with the brake drum 74 because of the clutched engagement between the teeth of the member 78 and the teeth 77 of said brake member. This upward movement also acts through the link 98 and lever 99 to swing the cam 101 about the shaft 100 as the cam moves away the lever 102 moving fork 91 and shoe 92 away from clutch member 82 to permit its free operation. With the controls in this position the transmission may be driven in low, second, or high gear for forward drive. If, as previously noted, while in high it is desired to shift back to second, the pulling of the wire 104 will act to swing the lever 102 upwardly and shift the shaft 90 so as to move the pressure member 92 toward the left to bring the clutch element 82 out of engagement with the clutch member 80, this movement of the shaft 90 being independent of the shaft 100. When the lever 97 is moved from the upper dotted line position to the neutral or to reverse, the cam 101 acts on the roller 103 to shift the lever 102 toward the left as viewed in Fig. 1 to disconnect the high speed clutch in the same manner that the independent movement of said lever by the wire 104 disconnects it. When the lever 97 is in neutral position, the shaft 96 has acted on the shifter lever 94 to bring the shiftable clutch element 78 into the position shown in Fig. 1 and then as the lever 97 is swung downwardly to its lower or "reverse" position, the shifter lever 94 acts to move the clutch member 78 so that its teeth engage with the clutch gear 70 which is keyed to the second speed shaft 26 and consequently holds this shaft against movement while the planetary gear carrier is free to rotate about the gear 27 and in doing so act through the planet gears, as previously described, to turn the shaft 36 in the reverse direction from that of the then driver 17 and at a speed of about low gear ratio.

Figure 2:
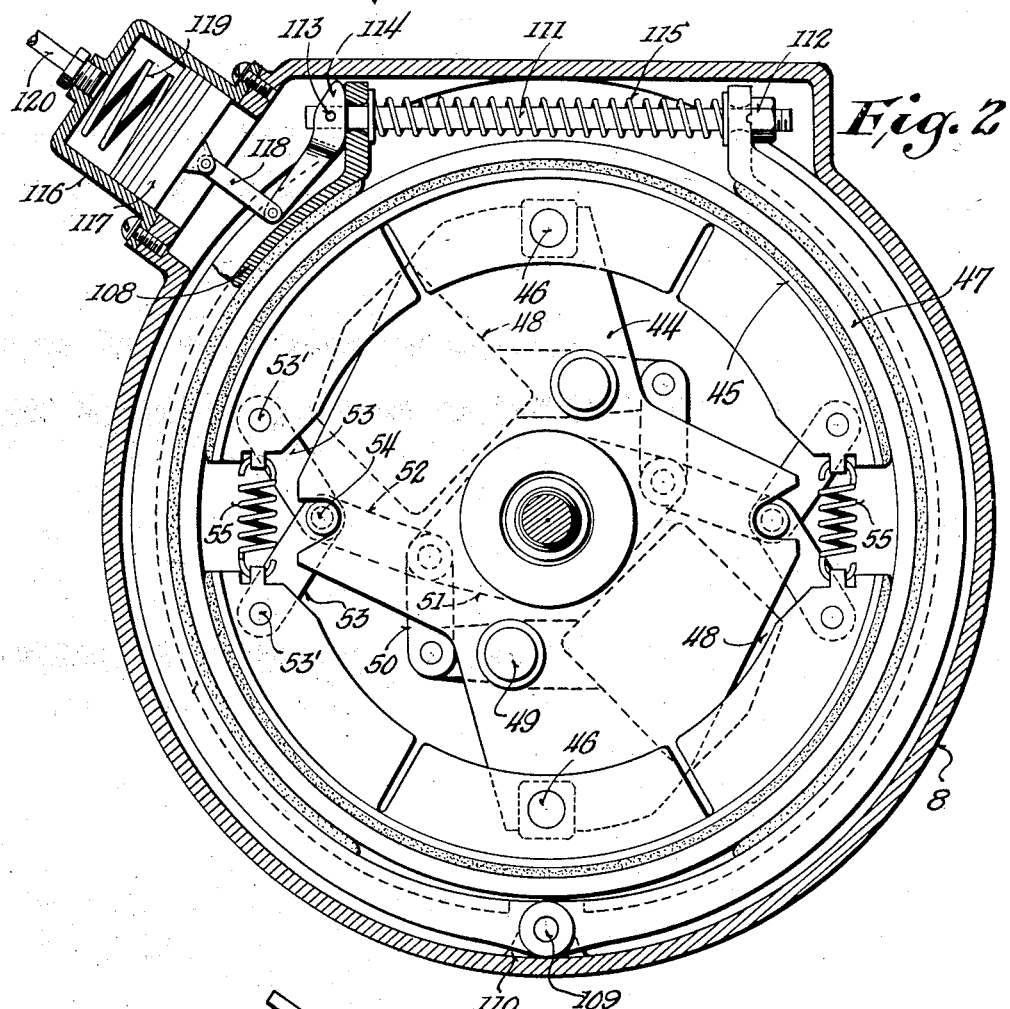
Fig. 2 is a detail sectional view taken on the line 2—2 of Fig. 1.

It is to be noted that the overrunning second speed clutch 62, 65 will not engage directly, but that it requires a temporary deceleration of the clutch member 62 in order to permit the elements 62 and 65 to synchronize. In some instances the slowing down of the part 62 through the slowing down of the engine may take a longer period than the operator considers necessary for effecting the shift, and in order to effect this shift more expeditiously a brake mechanism has been provided to slow down the rotation of the clutch member 62. This brake mechanism is preferably in the form of a brake band 108 of the external contracting type adapted to engage with the drum 47 of the low speed automatic centrifugal clutch. As shown in Fig. 2 the brake band 108 is formed of half sections pivoted at one of their ends at 109 to a bracket 110 mounted on the housing 8, the free ends of the brake sections 108 being apertured to receive the rod 111 which has a stop nut 112 adjustably mounted on one end thereof and a pivot 113 for an actuating lever cam 114 at the other end thereof, a release spring 115 being interposed between the free ends of said brake sections 108 and surrounding a portion of the rod extending therebetween. For drawing the free ends of the sections 108 together and thus putting a braking pressure on the drum 47, I prefer to move the actuator lever 114 through a power operated mechanism and preferably through using the vacuum of the engine. For this purpose a vacuum brake cylinder 116 is mounted on the housing 8 and has a piston 117 working therein and operatively connected by a link 118 to the free end of the lever 114. A release spring 119 is interposed between the top of the cylinder and the piston 117 to move the piston to release position. When, however, a vacuum pressure is produced in the upper end of the cylinder, the atmospheric pressure acts on the other side of the piston to move said piston 117 outwardly, and then the cam actuator 114 is tilted about the pin 113 so as to pull on the rod 111 and tend to shorten the distance between the free ends of the brake band or shoe 108 so as to cause a braking pressure to be exerted on the drum 47. The vacuum pressure is preferably received through piping 120 connected with the intake manifold 121 of the engine and is controlled by the valve shown in detail in Fig. 3. The valve embodies a casing 122 in which a piston 123 works and controls the suction in the piping 120. A spring 124 is interposed between the lower end of the valve casing and the valves and acts to hold the valve normally in a closed position in which it seals off the oppositely disposed ports 125 and 126 in the piping 120. When, however, the valve 123 is moved downwardly to bring the annular release groove 127 in line with the ports 125 and 126, the vacuum pressure will be established to the interior of the brake cylinder 116 and the brake will be applied. When the piston 123 is in its upper portion, a port 123' in it and a port 122' in the casing establish communication with atmosphere for the brake pipe 120 to assist in the release of the brake through the braking of the vacuum in the brake cylinder 116. As a convenient means for operating the valve, the extended stem 128 thereof is positioned to be engaged by the lower end 129 of the usual accelerator pedal 130, when said end 129 is moved by the operator downwardly from its normally inoperative position. As shown in Fig. 3 the accelerator pedal 130 engages an accelerator actuating pin or member 131 which in turn is moved by a spring 132 to a normally inoperative position and consequently moves the pedal 130 to a similar position, said pedal pivoting about the pin 133. If now the forward end of the pedal 130 is pressed downwardly, the accelerator will be operated, that is the throttle will be opened up and then this forward end under the action of the spring 132 may be moved to the release position shown in Fig. 3, as in decelerating the motor, and then while the motor is decelerated, the downward pressure on the other end 129 will act to move the valve 123 so as to establish the vacuum connection with the brake cylinder 116 and act to apply the brake 108 to the drum 47.

Where it is desired to disconnect the second speed clutch at any time and also to bring the second speed into operation independent of its centrifugal clutch mechanism, the modification shown in detail in Fig. 5 may be used. In this construction the member 70 and the clutch drum 69 are slidably keyed or splined on the shaft 26 together with the jaw clutch member 65 which is movable with or relative to these parts. For moving these parts as a unit a shifter fork 134 is slidably mounted on a rod 135 and has its fork portion working in an annular groove 136 formed between the member 70 and drum 69, said fork being normally held in the clutch release position by a spring 137 but adapted to be shifted manually through the engagement of the upper end 138 of the fork 94 with a lug 139 on said fork as said upper end swings about its center 140 and its lower end acts through the groove 95 to shift the clutch member 78 to a direct drive position. Springs similar to the springs 65' engage the collar 72 to hold it against its stop 72' and also act to yieldingly connect the clutch member 65 with drum 69 and member 70. The fork 94 shown in Fig. 1 is identical with that shown in Fig. 5 and similarly pivotally mounted intermediate its ends. Under normal driving conditions when the member 94 has been shifted to the position for forward drive, the shifter fork 134 has been moved from the separated neutral position shown in Fig. 5 into the position such as shown in Fig. 1 and then by a further movement of the parts 94 and 134 the jaws 62 and 65 may be engaged manually when the vehicle is at rest or may be engaged automatically as in the first described construction through the action of the governor weights 66 when the vehicle is in motion.

The casing 16 has an eccentric 141 mounted therein and splined to the driven shaft 32 and engaging a pump plunger 142 held thereagainst by a spring 143 and working in a bore 144 in said casing. The lower end of the bore 144 has a suction valve seat member 145 mounted therein provided with a suction valve 146 controlling the passage of lubricant from the passages 147, 148 to the body of the pump and a spring pressed discharge valve 149 in a valve fitting 150 controls the discharge from the pump to a passage 151 which conducts the lubricant to a passage 152 in the hub of clutch member 80 from whence it proceeds by an opening 153 into an axial duct 154 in the shaft 32 which communicates with a similar centrally disposed duct in the shaft 17, but not specifically shown, from which radial passages lead off to the various parts to be pressure-lubricated. As an example I show the passage 155 in the shaft 17 connected by an annular groove 156 with a passage 157 through the parts 26, 24' and 76 to the working surfaces of the one way roller brake including the rollers 75. The oil delivered to various parts is eventually thrown off by the rotating masses into the casing by centrifugal force and drains down into a sump 158 provided with a removable filter 159 insertable through an opening 160 in the casing section 8 and yieldingly held in place by a removable cover 161 and spring 162, the passage 148 being connected by passages 163 and 164 with said sump.

The operation in brief is as follows: With the vehicle at rest and the control shafts 96 and 80 in a neutral position, the operator starts the engine in the usual manner. After the engine has run for a period sufficient to warm it up, it is throttled down to idling speed and the operator shifts the control shaft 96 through lever 97 to forward drive where it stays under all ordinary conditions of driving. With the shaft 5 turning above an idling speed the clutch connecting the transmission with the engine is engaged since under these conditions the rotation of the support 44 at engine shaft speed causes the weights 48 through their connections with the shoes 45 to move them into clutching engagement with drum 47 which then in turning with the actuator 61 picks up the clutch rollers 63 which then grip the drum 64, fast to the low speed transmission drive shaft 17, and then as previously noted the drive through gears 25, 42, 43, 36 will turn the driven shaft 32 at low speed. Thereafter, at a predetermined car speed the shaft 26, which is then being rotated by the gearing through the rotation of gear 27 by gear 41, reaches a speed which causes the weights 66 to move outwardly and through collar 72 and spring 73 move clutch member 65 to an overrunning association with its companion member 62 and then when, as by a temporary reduction in speed of the drive for the member 64 as by temporarily throttling the engine, these parts are brought to a synchronized speed they move into mesh and then on accelerating the motor the torque is picked up and the transmission is in second speed from the shaft 26 through the gears 27, 41, 43, 36 to shaft 32.

If, while in second gear, the operator wishes to go into high speed or direct drive, he decelerates the engine speed so that the overrunning or one way roller brake including the rollers 75 will be released through relative differences in speed between the shaft 32 and its driver gear and on release the rotation of the planetary gear carrier 24 will act to energize the weights 83 which then act as previously described to bring the clutch member 82 into engagement with clutch member 80.

If while proceeding in high gear or direct drive the operator desires to go into second without waiting for or changing the speed, his shifting of the clutch member 82 from engagement with the member 80 brings this about. If in connection with a deceleration of the engine shaft 5 it is desired to speed up the shift, applying the brake shoes 45 to the drum 47 will bring this about.

Where it is desired to deliver the full torque of the engine through the low gear ratio the second speed clutch may be held out either by the structure shown in Fig. 5 or by placing the transmission in neutral and then the brake band 93 is applied. Also with the structure shown in Fig. 5 the second speed clutch may be moved to a position of engagement initially so that when the speed responsive engine clutch including the drum 47 takes hold the transmission will be driven directly in second.

It is sometimes desirable that a very quick shift of low to second be made at low car speeds as for instance in climbing a long steep grade where instead of pulling up in low gear all the way it is possible after the car gains sufficient momentum to shift into higher or second gear. Where the functioning of the automatic second speed clutch is dependent upon the speed of the second speed shaft it is not always possible to accomplish the shift from low to second under the conditions above mentioned, but the modification shown more particularly in Fig. 7 permits the operator to shift into second under relatively low speed conditions, and in this figure it is to be noted that the weight movement limiting and supporting drum 69' of the speed responsive means is mounted adjacent the clutch drum 61 and the web portion 58 of the drum 47 and is secured to these parts and to the part 60 by bolts similar to the bolts 59 shown in Fig. 1. The weights 66' are pivoted at 67' to brackets 68' and their ends 71' engage a collar 165 similar to the collar 72 and through said collar and a spring 73' exert pressure against the clutch element 65' which is slidably keyed to the hub of the drum 69 and is generally similar to the clutch element 65 and is adapted to engage a clutch element 166 which is formed on the face of a gear 167 which is similar to the gear 70 of the first described construction, said gear being splined to the sleeve shaft 26 and associated in the same way as shown in Fig. 1 with the member 78 shown more particularly therein. The clutch elements 65' and 166 are jaw clutch elements having inclined faces and are of the overrunning type. With this modified construction the centrifugal weights 66' are more quickly accelerated to produce a movement of the clutch elements 65' to a clutch engaging position with the clutch element 166, and even though in decelerating the engine to shift to second there is a temporary reduction in speed of the parts of the transmission, there is still enough speed and energy in the second speed clutch weight 66' to keep the jaw clutch elements in an engagable position so far as to assure a dependable shift from low to second at much steeper grades and more quickly than the first described arrangement.

It is also to be noted that by using a jaw type clutch for the second speed with the clearance of the jaws 62 and 65 greater than the backlash of the planetary transmission gearing there is a certain freedom of movement between the shafts 17 and 26 which is important because of the tendency of the clutch rollers 63 to pick up any little movement of said shaft and also because of the differential action between said shafts through the operation of the planetary gearing, and as the gearing under these conditions operates smoothly the manual or automatic operation of the high speed clutch may be smoothly effected.

In place of the straight jaw clutch elements 80 and 82 I may use a jaw clutch of the overrunning type such as shown in detail in Fig. 6 in which the teeth 82' are adapted to overrun or mesh with the teeth 80', these teeth corresponding in so far as general operation is concerned with the teeth on the members 82 and 80 of the construction shown in Fig. 1, it being noted, however, that with this modified construction the clutch elements may readily overrun each other before the speed of the planetary carrier synchronizes with that of the driven shaft to effect the direct drive which has been explained in detail in connection with the showing in Fig. 1.

I desire it to be understood that this invention is not to be limited to any specific form or arrangement of parts except in so far as such limitations are included in the claims.

What I claim as my invention is:

1. A change speed transmission mechanism comprising a drive shaft, a driven shaft, a single planetary gear unit connecting said shafts including a pair of transmission drive shafts, clutch mechanism connecting one of said transmission drive shafts with said first named drive shaft, speed responsive overrunning jaw clutch mechanism for establishing the drive from said first named drive shaft through the other of said transmission drive shafts on a temporary reduction in speed of said first named drive shaft, said gear unit including a planetary gear carrier, automatic brake mechanism for said planetary carrier, and speed responsive jaw clutch mechanism for connecting said carrier with said driven shaft for direct drive.

2. In a change speed transmission mechanism, the combination of a drive shaft, a driven shaft, a planetary gearing between said shafts for establishing a plurality of gear ratios therebetween, an overrunning speed responsive jaw clutch connection for connecting one ratio of said gearing to said drive shaft and operable on a temporary reduction in speed of said drive shaft, the clearance between the jaws of said clutch connection being greater than the backlash of said gearing.

3. In a change speed transmission, the combination of a drive shaft, a driven shaft, planetary gearing between said shafts for establishing different speed ratios therebetween, an overrunning jaw clutch mechanism for connecting one ratio of said gearing to said drive shaft and operable on a temporary reduction in speed of said drive shaft and including a shiftable jaw clutch member, speed responsive means controlling said shiftable member, and manually operated means also acting to shift said member.

4. In a change speed transmission, the combination of a drive shaft, a driven shaft, planetary gearing between said shafts for establishing different speed ratios therebetween, clutch mechanism for connecting one ratio of said gearing to said drive shaft and including a shiftable clutch member, speed responsive means controlling said member, and manually operable means also acting to shift said member.

5. In a change speed transmission, the combination of a drive shaft, a driven shaft, a single planetary gear unit connecting said shafts including a pair of transmission drive shafts, clutch mechanism connecting one of said transmission drive shafts with said first named drive shaft, speed responsive overrunning jaw clutch mechanism for establishing the drive from said first named drive shaft through the other of said transmission drive shafts on a temporary reduction in speed of said first named drive shaft, said gear unit including a planetary gear carrier, automatic brake mechanism for said planetary carrier, and clutch mechanism operable on the release of said brake mechanism for connecting said carrier with said driven shaft for direct drive.

6. In a change speed transmission, the combination of a drive shaft, a driven shaft, planetary gearing between said shafts including a planetary gear carrier, automatic brake mechanism for said carrier releasable on a change in speed between said driven shaft and parts of said gearing, clutch mechanism for connecting said carrier with said driven shaft on a release of said brake mechanism and including a shiftable clutch element mounted on said carrier, speed responsive operated means for shifting said shiftable element including a spring, and manually operable means for shifting said element to a release position against the action of said spring.

7. In a change speed transmission, the combination of a drive shaft, a driven shaft, automatically variable change speed transmission mechanism between said shafts operable to change the speed ratio on a reduction in speed of said drive shaft and constantly connecting said shafts in driving relation, said transmission mechanism including an overrunning clutch to permit the drive shaft to drop in speed relatively to the driven shaft and manually controlled power operated means selectively operable at the will of the operator for reducing the speed of said drive shaft to speed up the change of speed ratio.

8. In a change speed transmission, the combination of a drive shaft, an automatically variable speed responsive controlled transmission device, an automatic speed responsive clutch mechanism continuously connecting said shaft with said device during the operation of said drive shaft above an idling speed, and brake mechanism for slowing down the driven element of said clutch mechanism.

9. In a change speed transmission, the combination of an engine having an accelerator pedal control, a drive shaft, an automatically variable speed responsive controlled transmission device, an automatic speed responsive clutch mechanism connecting said shaft with said device, brake mechanism for slowing down the driven element of said clutch, power means for operating said brake mechanism, and a control for said power means operable by said accelerator pedal in its "off" position.

10. In a change speed transmission, the combination of a drive shaft, a driven shaft, a single planetary gear unit between said shafts including a pair of transmission drive shafts, an automatic clutch and a one way overrunning clutch connecting said drive shaft with one of said transmission drive shafts, and an overrunning jaw clutch operable through a temporary reduction in speed of the drive shaft to connect the second of said transmission drive shafts through said automatic clutch with said drive shaft, and means for connecting said drive and driven shafts directly together through said gearing for direct drive.

11. In a change speed transmission, the combination of a drive member, a driven shaft, an overrunning jaw type clutch mechanism for connecting said drive member with said driven shaft adapted to drive in either direction including a shiftable jaw member, speed responsive mechanism for shifting said jaw member to a position for engagement, and manually operable means for moving said jaw member to a position to render it inoperative from the automatic operation of said speed responsive mechanism.

12. In a change speed transmission, the combination of a drive member, a driven shaft, an overrunning jaw type clutch mechanism for connecting said drive member with said driven shaft including a shiftable jaw member, speed responsive mechanism for shifting said jaw member to a position for engagement, and manually operable means for moving both said speed responsive mechanism and said shiftable jaw member to a position to render said jaw member inoperative.

13. In a change speed transmission, the combination of a driving shaft, a driven shaft, change speed planetary gearing between said shafts including a planetary gear carrier, automatic brake mechanism preventing backward rotation of said carrier when driving through said gearing, an overrunning jaw clutch mechanism for connecting said carrier direct with said driven shaft, speed responsive mechanism mounted on said carrier for controlling said clutch mechanism, said brake mechanism being releasable on a temporary deceleration of the driving shaft, the parts of said clutch mechanism being engageable when said speed responsive mechanism becomes operative on the rotation of said carrier and the speed of the planetary carrier and said driven shaft are synchronized.

14. In a change speed transmission, the combination of a driving shaft, a driven shaft, change speed planetary gearing between said shafts including a planetary gear carrier, automatic brake mechanism preventing backward rotation of said carrier when driving through said gearing, a jaw clutch for connecting said carrier direct with said driven shaft including a yieldingly mounted shiftable jaw clutch element, speed responsive mechanism mounted on said carrier for moving said shiftable clutch member to an engaging position, said brake mechanism being releasable on a temporary deceleration of said driving shaft, said shiftable clutch element engaging with its cooperative clutch element when said speed responsive mechanism becomes operative on the rotation of the carrier and the speed of the planetary carrier and said driven shaft are synchronized.

15. In a change speed transmission, the combination of a driving shaft, a driven shaft, change speed planetary gearing between said shafts including a planetary gear carrier, automatic brake mechanism preventing backward rotation of said carrier when driving through said gearing, an overrunning jaw type clutch mechanism for connecting said carrier direct with said driven shaft including a yieldingly mounted shiftable jaw clutch element, speed responsive mechanism mounted on said carrier for moving said shiftable clutch member to an engaging position, said brake mechanism being releasable on a temporary deceleration of the driving shaft, said shiftable clutch element engaging with its cooperative clutch element when said speed responsive mechanism becomes operative on the rotation of said carrier and the speed of the planetary carrier and said driven shaft are synchronized, and manually operable means for shifting said shiftable jaw clutch element out of engagement with its cooperative element when the driving torque between said elements is temporarily broken.

16. In a change speed transmission, the combination of a drive shaft, a pair of driven shafts, a one way clutch connection between one of said driven shafts and said drive shaft, gearing connections between said driven shafts for driving the other of said driven shafts at a speed below that of the drive shaft, speed responsive overrunning jaw clutch mechanism for establishing the drive from said drive shaft to the driven shaft being driven through said gearing on a temporary reduction in speed of said drive shaft, and brake mechanism for slowing down said drive shaft.

17. In a change speed transmission, the combination of a drive member, a driven shaft, a single planetary gear unit between said drive member and driven shaft including a pair of transmission drive shafts, a one way overrunning clutch connecting said drive member with one of said transmission drive shafts for one speed ratio of said unit, an overrunning jaw clutch operable through a temporary reduction in speed of the drive member to connect the second of said transmission drive shafts to said drive member for another speed ratio of said unit, and means for connecting said drive member and driven shaft directly together through said gearing for direct drive.

18. A change speed transmission mechanism comprising a drive member, a driven shaft, a reduction gear unit between said drive member and driven shaft including a pair of transmission drive shafts, a one way overrunning clutch connecting said drive member with one of said transmission drive shafts for one speed ratio of said unit, an overrunning jaw clutch operable through a temporary reduction in speed of said drive member to connect the second of said transmission drive shafts to said drive member for another speed ratio of said unit, centrifugally operated means dependent on the speed of said drive member to bring the elements of said jaw clutch into overrunning relation, and means for connecting said drive member and driven shaft directly together through said gearing for direct drive.

19. In a change speed transmission, the combination of a drive shaft, a driven shaft, change speed planetary gearing between said shafts including a planetary gear carrier, automatic brake mechanism preventing backward rotation of said carrier when driving through said gearing, a manual control for said brake mechanism whereby to put said gearing in forward, neutral or reverse drive, a clutch mechanism for connecting said carrier direct with said driven shaft, speed responsive mechanism mounted on said carrier for controlling said clutch, means for releasing said last named clutch mechanism when the transmission is placed in neutral or reverse comprising a cam operatively connected with the manual control for said brake mechanism, and means for independently releasing said last named clutch mechanism.

20. In a change speed transmission mechanism, the combination of a drive shaft, a driven shaft, transmission mechanism connecting said shafts including a pair of transmission drive shafts having change speed gearing therebetween, an overrunning clutch connecting one of said transmission drive shafts with said first named drive shaft, speed responsive overrunning jaw clutch mechanism for establishing the drive from said first named drive shaft through the other of said transmission drive shafts on a temporary reduction in speed of said first named drive shaft, the clearance between the jaws of said jaw clutch mechanism being greater than the backlash of said gearing.

21. In a change speed transmission mechanism, the combination of a drive shaft, a driven shaft, transmission mechanism connecting said shafts including a pair of transmission drive shafts, a free wheeling clutch connecting one of said transmission shafts with said drive shaft, and an overrunning speed responsive jaw clutch connection between said drive shaft and the other of said transmission drive shafts, the clearance between the jaws of said last named clutch connection being greater than that of said free wheeling clutch to provide freedom of movement between said transmission drive shafts.

22. In a change speed transmission, the combination of a drive member having an overrunning jaw clutch element and an overrunning one way clutch element secured thereto, a pair of driven shafts, one of said shafts having a cooperative one way clutch element mounted thereon and the other of said shafts having a jaw clutch element movable into engagement with the jaw clutch element on said drive member.

OSCAR H. BANKER.